United States Patent
Yoon et al.

(10) Patent No.: US 10,333,142 B2
(45) Date of Patent: Jun. 25, 2019

(54) SECONDARY BATTERY INCLUDING SILICON-BASED COMPOUND

(71) Applicant: LG CHEM, LTD., Seoul (KR)

(72) Inventors: Yeo Kyung Yoon, Daejeon (KR); Ju Bin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 15/026,445

(22) PCT Filed: Aug. 29, 2014

(86) PCT No.: PCT/KR2014/008056
§ 371 (c)(1),
(2) Date: Mar. 31, 2016

(87) PCT Pub. No.: WO2015/053478
PCT Pub. Date: Apr. 16, 2015

(65) Prior Publication Data
US 2016/0293944 A1    Oct. 6, 2016

(30) Foreign Application Priority Data

Oct. 7, 2013 (KR) .................. 10-2013-0119049

(51) Int. Cl.
*H01M 4/48* (2010.01)
*H01M 4/133* (2010.01)
*H01M 4/134* (2010.01)
*H01M 10/0569* (2010.01)
(Continued)

(52) U.S. Cl.
CPC .......... *H01M 4/483* (2013.01); *H01M 4/133* (2013.01); *H01M 4/134* (2013.01); *H01M 4/386* (2013.01);
(Continued)

(58) Field of Classification Search
CPC ...... H01M 4/483; H01M 4/133; H01M 4/134; H01M 1/386; H01M 10/0525; H01M 10/0568; H01M 10/0569
See application file for complete search history.

(56) References Cited

U.S. PATENT DOCUMENTS

2004/0115535 A1*  6/2004  Morita ................ H01M 4/364
                                                    429/231.8
2008/0248397 A1* 10/2008  Jung ..................... H01M 4/525
                                                    429/314
(Continued)

FOREIGN PATENT DOCUMENTS

CN    101609891 A    12/2009
JP    2008-41465 A    2/2008
(Continued)

OTHER PUBLICATIONS

International Search Report issued in PCT/KR2014/008056, dated Dec. 15, 2014.

*Primary Examiner* — Helen Oi K Conley
(74) *Attorney, Agent, or Firm* — Birch, Stewart, Kolasch & Birch, LLP

(57) ABSTRACT

Disclosed is a secondary battery including a positive electrode including a current collector coated with a positive electrode mixture that includes a positive electrode active material; a negative electrode including a current collector coated with a negative electrode mixture that includes a negative electrode active material; and an electrolyte solution including a lithium salt and a non-aqueous solvent, wherein the negative electrode includes a carbon-based material and a silicon-based compound, and the non-aqueous solvent includes cyclic carbonate and/or a linear solvent. The secondary battery exhibits superior lifespan characteristics and safety.

7 Claims, 2 Drawing Sheets

(51) Int. Cl.
*H01M 4/38* (2006.01)
*H01M 4/62* (2006.01)
*H01M 10/0525* (2010.01)
*H01M 10/0568* (2010.01)
*H01M 4/02* (2006.01)

(52) U.S. Cl.
CPC ....... *H01M 4/625* (2013.01); *H01M 10/0525* (2013.01); *H01M 10/0568* (2013.01); *H01M 10/0569* (2013.01); *H01M 2004/027* (2013.01); *H01M 2300/0025* (2013.01); *Y02T 10/7011* (2013.01)

(56) References Cited

U.S. PATENT DOCUMENTS

| | | | |
|---|---|---|---|
| 2009/0029256 A1 | 1/2009 | Mah et al. | |
| 2009/0068565 A1* | 3/2009 | Lee .................. | H01M 10/0567 429/331 |
| 2012/0021296 A1 | 1/2012 | Funada et al. | |
| 2012/0107695 A1 | 5/2012 | Lee et al. | |
| 2013/0252110 A1 | 9/2013 | Park et al. | |
| 2014/0234704 A1 | 8/2014 | Kamizori et al. | |

FOREIGN PATENT DOCUMENTS

| | | |
|---|---|---|
| JP | 2010-92830 A | 4/2010 |
| JP | 2011-233368 A | 11/2011 |
| JP | 2012-18796 A | 1/2012 |
| JP | 2013-149370 A | 8/2013 |
| KR | 10-2002-0070762 A | 9/2002 |
| KR | 10-2009-0011888 A | 2/2009 |
| KR | 10-2011-0083930 A | 7/2011 |
| KR | 10-2011-0115025 A | 10/2011 |
| KR | 10-2012-0046482 A | 5/2012 |
| KR | 10-2013-0014245 A | 2/2013 |
| KR | 10-2013-0106687 A | 9/2013 |
| WO | WO 2013/047747 A1 | 4/2013 |

* cited by examiner

[FIG. 1]
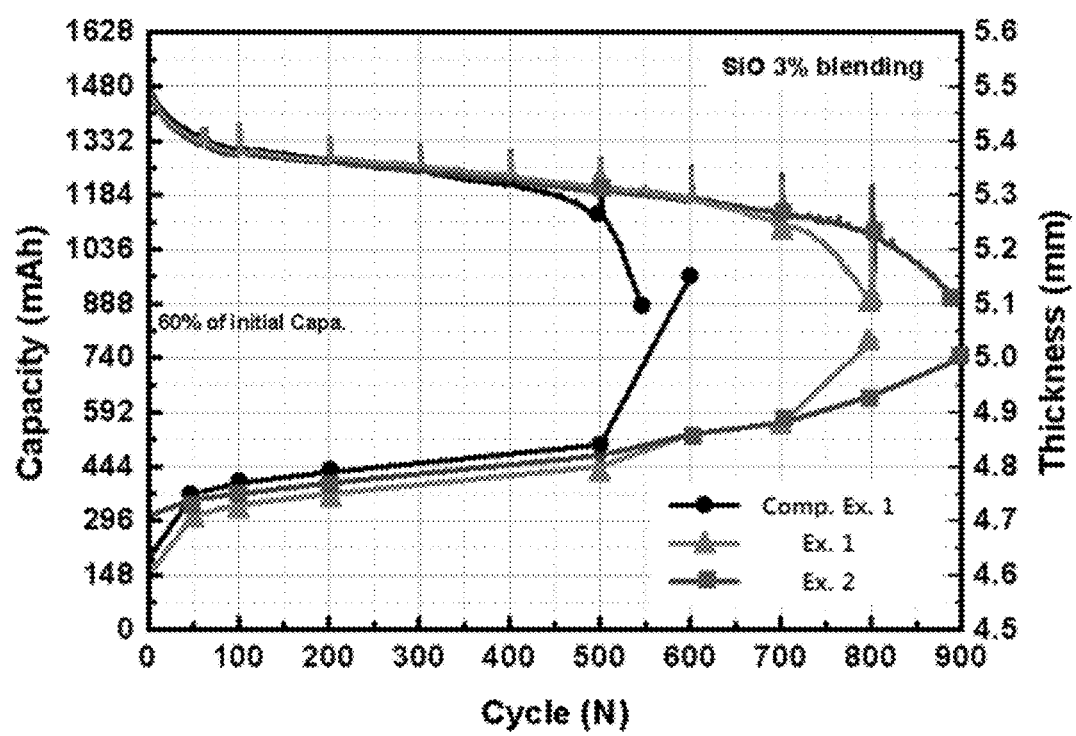

[FIG. 2]
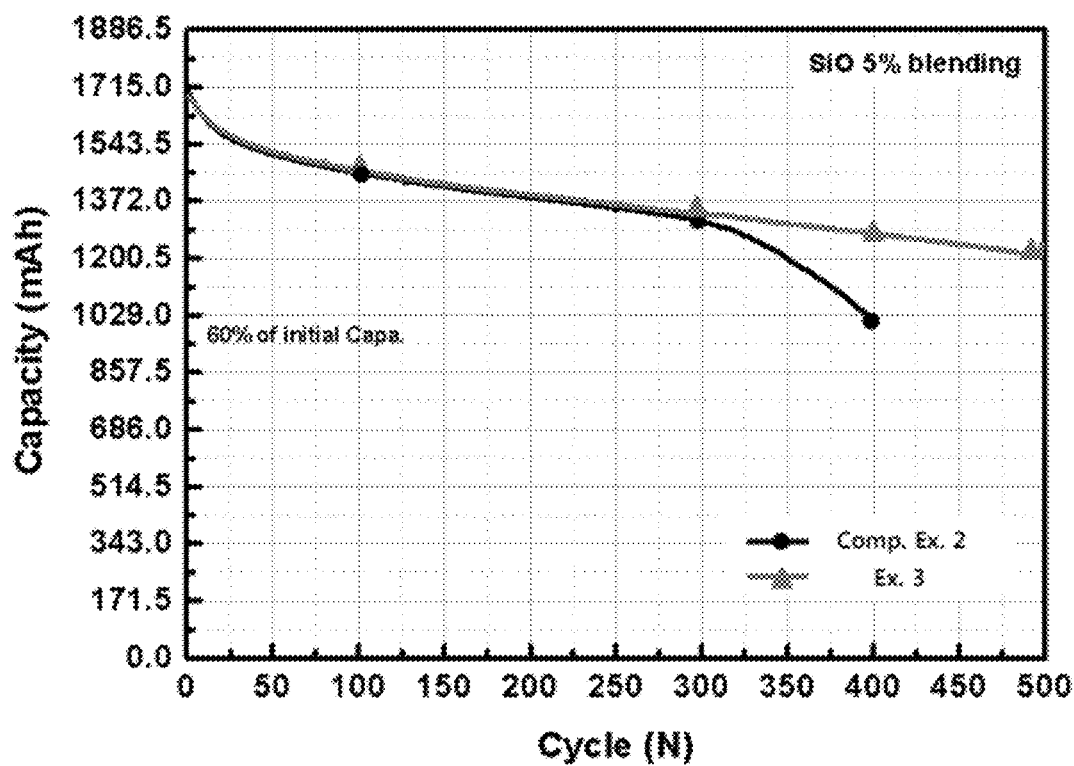

SECONDARY BATTERY INCLUDING SILICON-BASED COMPOUND

TECHNICAL FIELD

The present invention relates to a secondary battery having enhanced lifespan characteristics and safety by including a silicon-based compound.

BACKGROUND ART

As mobile device technology continues to develop and demand therefor continues to increase, demand for secondary batteries as energy sources is rapidly increasing. Among these secondary batteries, lithium secondary batteries which exhibit high energy density and voltage, long lifespan and low self-discharge rate are commercially available and widely used.

In existing lithium secondary batteries, a lithium cobalt composite oxide having a layered structure is generally used in a positive electrode, and a graphite-based material is generally used in a negative electrode. However, cobalt, as a constituent of the lithium cobalt composite oxide, is very expensive, and use of the lithium cobalt composite oxide in electric vehicles is not suitable due to unsatisfied safety thereof. In addition, the lithium cobalt composite oxide has difficulties in exhibiting high capacity according to energy density increase.

Accordingly, as a positive electrode active material, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration. In addition, as a negative electrode active material, a carbon-based material is mainly used, and, recently, a mixture of SiO having 10 times or higher effective capacity than that of the carbon-based material is under consideration due to demand increase for high-capacity secondary batteries.

However, lithium secondary batteries have various problems. For example, some lithium secondary batteries have problems related with characteristics in manufacturing and operating a negative electrode.

For example, in an initial charge and discharge process (activation process) of a carbon-based negative electrode active material, a solid electrolyte interface (SEI) layer is formed on a surface of the negative electrode active material and, accordingly, initial irreversibility is induced. In addition, an SEI layer is collapsed in a continuous charge and discharge process and an electrolyte solution is depleted in a regeneration process, whereby a battery capacity is reduced.

Furthermore, when a carbon-based material and SiO are mixed, problems according to SEI layer formation can worsen with increasing cycle number because SiO causes greater electrode expansion, compared to the carbon-based material.

So as to address such problems, it was attempted to form an SEI layer having far stronger binding force, to form an oxide layer or the like on a surface of a negative electrode active material, or the like. However, such an SEI layer does not exhibit commercially applicable characteristics due to electrical conductivity decrease by the oxide layer, productivity decrease by an additional process, etc.

In addition, an additive may be added to an electrolyte solution. However, a main object of an electrolyte solution additive conventionally used is to prevent side products generated during charge and discharge.

Therefore, there is an urgent need for technology to fundamentally resolve such problems.

DISCLOSURE

Technical Problem

Therefore, the present invention has been made to solve the above and other technical problems that have yet to be resolved.

As a result of a variety of extensive and intensive studies and experiments, the inventors of the present invention confirmed that, upon preparation of a secondary battery including a negative electrode active material, which includes a silicon-based compound, and an electrolyte solution, which includes predetermined carbonates, as described below, lifespan characteristics and safety of a battery are enhanced and thus desired effects can be accomplished, thereby completing the present invention.

Technical Solution

In accordance with one aspect of the present invention, provided is a secondary battery including a positive electrode including a current collector coated with a positive electrode mixture that includes a positive electrode active material; a negative electrode including a current collector coated with a negative electrode mixture that includes a negative electrode active material; and an electrolyte solution including a lithium salt and a non-aqueous solvent, wherein the negative electrode includes a carbon-based material and a silicon-based compound, and the non-aqueous solvent includes cyclic carbonate and/or a linear solvent.

When a carbon-based material and SiO are mixed to enhance the capacity of a secondary battery, problems according to SEI layer formation can worsen with increasing cycle number because SiO causes greater electrode expansion, compared to the carbon-based material, as described above.

Accordingly, the secondary battery according to the present invention includes electrolytes that include predetermined carbonates, and thus, problems according to SEI layer formation caused by use of the carbon-based material and the silicon-based compound as negative electrode active materials can be addressed, whereby safety can be secured and lifespan characteristics and capacity characteristics of the secondary battery may be enhanced.

In the present invention, the carbon-based material may be, for example, graphite such as natural or artificial graphite, carbon black such as carbon black, acetylene black, Ketjen black, channel black, furnace black, lamp black, or thermal black, or carbon fiber. These materials may be used alone or as a mixture two or more thereof. The carbon-based material may be particularly graphite.

The silicon-based compound may be one or more selected from the group consisting of chlorosilane, alkoxysilane, aminosilane, fluoroalkylsilane, silicon, silicon chloride, and silicon oxide (SiO). More particularly, the silicon-based compound may be silicon oxide (SiO). The silicon oxide (SiO) may include silicon dioxide ($SiO_2$) and amorphous silicon mixed in a weight ratio of 1:1.

When the amount of the silicon (Si)-based compound is too small, it is difficult to increase energy density and thus it is difficult to realize a high-capacity battery. When the amount of the silicon (Si)-based compound is too high, volume expansion of the negative electrode may undesirably increase. Therefore, the carbon-based material and the silicon (Si)-based compound may be mixed in a weight ratio of 80:20 to 99:1, particularly 90:10 to 99:1, more particularly 95:5 to 97:3, most particularly 95:5 or 97:3.

The cyclic carbonate may be specifically limited so long as known in the art and may be one or more selected from the group consisting of, for example, ethylene carbonate (EC), propylene carbonate (PC), and butylene carbonate (BC).

The linear solvent includes linear carbonate and linear ester, and may be one or more selected from the group consisting of, for example, dimethyl carbonate (DMC), diethyl carbonate (DEC), ethyl methyl carbonate (EMC), methyl propionate (MP), and ethyl propionate (EP).

The cyclic carbonate and the linear solvent may be mixed in a volume ratio of 1:0.5 to 1:8, particularly 1:1 to 1:3.

So as to enhance lifespan characteristics, the electrolyte solution may additionally include vinylene carbonate (VC) and fluoroethylene carbonate (FEC).

Here, the content of the vinylene carbonate (VC) may be greater than 0.5% by weight and 5% by weight or less based on a total weight of the electrolyte, and the content of the fluoroethylene carbonate (FEC) may be greater than 1% by weight and 10% by weight or less based on a total weight of the electrolyte. Particularly, the content of the vinylene carbonate (VC) may be 1.0% by weight or more and 4.0% by weight or less based on a total weight of the electrolyte, and the content of the fluoroethylene carbonate (FEC) may be 2% by weight or more and 7% by weight and less based on a total weight of the electrolyte. More particularly, the content of the vinylene carbonate (VC) may be 1.5% by weight or more and 3% by weight or less based on the total weight of the electrolyte, the content of the fluoroethylene carbonate (FEC) may be 2% by weight or more and 5% by weight or less based on the total weight of the electrolyte.

When the content of the vinylene carbonate (VC) as an additive is 0.5% by weight or less based on the total weight of the electrolyte or the content of the fluoroethylene carbonate (FEC) as an additive is 1% by weight or less based on the total weight of the electrolyte, volume expansion of a negative electrode, to which silicon oxide is applied, included in a secondary battery may be undesirably increased. When the content of the vinylene carbonate (VC) is greater than 5% by weight or the content of the fluoroethylene carbonate (FEC) is greater than 10% by weight, lifespan characteristics of a battery including the materials may be undesirably decreased.

The secondary battery may be a lithium secondary battery.

Hereinafter, a configuration of such a lithium secondary battery is described in detail.

The lithium secondary battery includes a positive electrode, which is prepared by coating a mixture of the following positive electrode active material, a conductive material, and a binder on a positive electrode current collector and drying and pressing the coated positive electrode current collector, and a negative electrode prepared using the same method as that used to manufacture the positive electrode. In this case, the mixture may further include a filler as desired.

The positive electrode current collector is generally fabricated to a thickness of 3 to 500 µm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The lithium secondary battery may include, as a positive electrode active material, lithium nickel oxides (LiNiO$_2$; lithium manganese oxides such as compounds of Formula Li$_{1+x}$Mn$_{2-x}$O$_4$ where $0 \leq x \leq 0.33$, LiMnO$_3$, LiMn$_2$O$_3$, and LiMnO$_2$; lithium copper oxide (Li$_2$CuO$_2$); vanadium oxides such as LiV$_3$O$_8$, LiV$_3$O$_4$, V$_2$O$_5$, and Cu$_2$V$_2$O$_7$; Ni-site type lithium nickel oxides of Formula LiNi$_{1-x}$M$_x$O$_2$ where M=Co, Mn, Al, Cu, Fe, Mg, B, or Ga, and $0.01 \leq x \leq 0.3$; lithium manganese composite oxides of Formula LiMn$_{2-x}$M$_x$O$_2$ where M=Co, Ni, Fe, Cr, Zn, or Ta, and $0.01 \leq x \leq 0.1$), or Formula Li$_2$Mn$_3$MO$_8$ where M=Fe, Co, Ni, Cu, or Zn; spinel-structure lithium manganese composite oxides of Formula LiNi$_x$Mn$_{2-x}$O$_4$ where x=0.01 to 0.6; LiMn$_2$O$_4$ in which some of the Li atoms are substituted with alkaline earth metal ions; disulfide compounds; Fe$_2$(MoO$_4$)$_3$; and the like.

The conductive material is generally added in an amount of 1 to 50 wt % with respect to the total weight of a mixture including a positive electrode active material. Such a conductive material is not specifically limited so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The negative electrode current collector is typically fabricated to a thickness of 3 to 500 µm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The lithium secondary battery may have a structure in which an electrode assembly, which includes a positive electrode, a negative electrode, and a separator disposed between the positive electrode and the negative electrode, is impregnated with a lithium salt-containing electrolyte.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing electrolyte solution is composed of a non-aqueous solvent and a lithium salt. The lithium salt is a material that is readily soluble in the non-aqueous electrolyte and examples thereof include, but are not limited to, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and propene sultone (PRS) and the like may be further included.

In a preferred embodiment, the lithium salt-containing non-aqueous electrolyte may be prepared by adding a lithium salt such as LiPF$_6$, LiClO$_4$, LiBF$_4$, LiN(SO$_2$CF$_3$)$_2$, or the like to a high dielectric solvent.

The battery pack including at least one lithium secondary battery described above may be used as a power source for devices that require stability at high temperature, long cycle life, and high rate characteristics.

Examples of the device includes, but are not limited to, large devices such as electric vehicles (EVs), hybrid electric vehicles (HEVs), and plug-in hybrid electric vehicles (PHEVs) and small devices such as mobile phones, notebook computers, netbooks, tablet PCs, PDAs, digital cameras, portable navigators, portable game consoles.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates results according to Experimental Example 1 of the present invention; and FIG. 2 illustrates results according to Experimental Example 2 of the present invention.

MODE FOR INVENTION

Now, the present invention will be described in more detail with reference to the accompanying drawings. These examples are provided for illustrative purposes only and should not be construed as limiting the scope and spirit of the present invention.

Example 1

Graphite and silicon oxide (SiO), which were mixed in weight ratio of 97:3, as negative electrode active materials, Denka black as a conductive material, and a water-based binder (SBR/CMC) were added to distilled water in a weight ratio of 97:0.5:2.5, followed by mixing. As a result, a negative electrode mixture was prepared. The prepared negative electrode mixture was coated on copper foil, followed by rolling and drying. As a result, a negative electrode was manufactured.

In addition, LiCoO$_2$ as a positive electrode active material, Denka black as a conductive material, and PVdF as a binder were added to NMP in a weight ratio of 96.5:2.0:1.5, followed by mixing. As a result, a positive electrode mixture was prepared. The prepared positive electrode was coated on aluminum foil, followed by rolling and drying. As a result, a positive electrode was manufactured.

A polyethylene layer as a separator was disposed between the prepared negative electrode and positive electrode, and an electrolyte solution including a solvent composed of EC, EMC, and DEC mixed in a volume ratio of 3:2:5 and 1 M LiPF$_6$ included therein, and 1.5% by weight of VC and 5% by weight of FEC, as additives for the electrolyte solution, based on the total weight of an electrolyte were used. As a result, a secondary battery was manufactured.

Example 2

A secondary battery was manufactured in the same manner as in Example 1, except that 2% by weight of VC and 5% by weight of FEC was used as electrolyte solution additives.

Comparative Example 1

A secondary battery was manufactured in the same manner as in Example 1, except that 0.5% by weight of VC and 5% by weight of FEC were used as electrolyte solution additives.

Example 3

A secondary battery was manufactured in the same manner as in Example 1, except that an electrolyte solution including a solvent composed of EC, EP, and DEC mixed in a volume ratio of 4:1:5 and 1 M LiPF$_6$ included therein, and 2% by weight of VC and 5% by weight of FEC, as additives for the electrolyte solution, based on the total weight of an electrolyte were used.

Comparative Example 2

A secondary battery was manufactured in the same manner as in Example 1, except that 2% by weight of VC and 1% by weight of FEC were used as electrolyte solution additives.

Experimental Example 1

The secondary batteries manufactured according to Examples 1 and 2 and Comparative Example 1 were charged and discharged in a range of 2.7 to 4.35 V at 1 C/1 C to measure changes in charge and discharge capacities and the thicknesses of the batteries. Results are summarized in FIG. 1 below.

Referring to FIG. 1 below, as charge and discharge are repeated, capacity decrease ratios in the batteries according to Examples 1 and 2 are smaller than that of the battery according to Comparative Example 1.

In addition, with regard to battery thickness increase ratios due to swelling according to repeated charge and discharge, it can be confirmed that thickness increase ratios in the batteries according to Examples 1 and 2 are smaller than that in the battery according to Comparative Example 1.

Experimental Example 2

The secondary batteries manufactured according to Example 3 and Comparative Example 2 were charged and discharged in a range of 2.7 to 4.35 V at 1 C/1 C to measure charge and discharge capacity changes according to repeated charge and discharge cycles. Results are summarized in FIG. 2 below.

Referring to FIG. 2, it can be confirmed that, as charge and discharge cycles increase, the battery according to Example 3 exhibits a smaller capacity decrease ratio, compared to the battery according to Comparative Example 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a secondary battery according to the present invention includes a carbon-based material and a predetermined silicon-based compound as negative electrode active materials, capacity is greatly increased, and thus, superior lifespan characteristics are exhibited. In addition, by using an electrolyte solution including a predetermined carbonate, volume expansion of a negative electrode can be prevented.

The invention claimed is:

1. A secondary battery, comprising:
   (i) a positive electrode comprising a current collector coated with a positive electrode mixture that comprises a positive electrode active material;
   (ii) a negative electrode comprising a current collector coated with a negative electrode mixture that comprises a negative electrode active material,
      wherein the negative electrode active material consists of a mixture of a carbon-based material and SiO; and
   (iii) an electrolyte solution consisting of a lithium salt, a non-aqueous solvent, vinylene carbonate (VC) and fluoroethylene carbonate (FEC),
      wherein the non-aqueous solvent comprises cyclic carbonate and a linear solvent,
      wherein the linear solvent comprises linear carbonate and linear ester,
      wherein the linear ester comprise one or more selected from the group consisting of methyl propionate and ethyl propionate, and
      wherein a content of the vinylene carbonate (VC) is 1.0% by weight or more and 4.0% by weight or less based on a total weight of the electrolyte solution, and a content of the fluoroethylene carbonate (FEC) is 2% by weight or more and 7% by weight and less based on a total weight of the electrolyte solution.

2. The secondary battery according to claim 1, wherein the carbon-based material is graphite.

3. The secondary battery according to claim 1, wherein the carbon-based material and the SiO are mixed in a weight ratio of 80:20 to 99:1.

4. The secondary battery according to claim 1, wherein the carbon-based material and the SiO are mixed in a weight ratio of 90:10 to 99:1.

5. The secondary battery according to claim 1, wherein the cyclic carbonate is one or more selected from the group consisting of ethylene carbonate (EC), propylene carbonate (PC), and butylene carbonate (BC).

6. The secondary battery according to claim 1, wherein the secondary battery is a lithium secondary battery.

7. A device comprising at least one secondary battery according to claim 1.

\* \* \* \* \*